US011427655B2

(12) United States Patent
Saito et al.

(10) Patent No.: US 11,427,655 B2
(45) Date of Patent: Aug. 30, 2022

(54) ACRYLIC POLYMER PARTICLES, PRODUCTION PROCESS THEREFOR, INK COMPOSITION, AND COATING COMPOSITION

(71) Applicant: MITSUBISHI CHEMICAL CORPORATION, Chiyoda-ku (JP)

(72) Inventors: Yoshikazu Saito, Tokyo (JP); Takahiro Mukuda, Tokyo (JP); Hiroyuki Fukuoka, Tokyo (JP); Makoto Moriya, Tokyo (JP); Masaaki Kiura, Tokyo (JP); Masashi Serizawa, Tokyo (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 174 days.

(21) Appl. No.: 16/582,558

(22) Filed: Sep. 25, 2019

(65) Prior Publication Data

US 2020/0017613 A1 Jan. 16, 2020

Related U.S. Application Data

(60) Division of application No. 15/941,946, filed on Mar. 30, 2018, now Pat. No. 10,472,433, which is a continuation of application No. PCT/JP2016/055431, filed on Feb. 24, 2016.

(30) Foreign Application Priority Data

Jan. 4, 2016 (JP) .............................. JP2016-000090

(51) Int. Cl.
| | |
|---|---|
| *C08F 20/14* | (2006.01) |
| *C08F 2/18* | (2006.01) |
| *C08F 2/20* | (2006.01) |
| *C08F 6/24* | (2006.01) |
| *C08F 220/18* | (2006.01) |
| *C08J 3/12* | (2006.01) |
| *C09D 7/65* | (2018.01) |
| *C09D 7/40* | (2018.01) |
| *C09D 133/04* | (2006.01) |
| *C09D 4/00* | (2006.01) |
| *C09D 11/107* | (2014.01) |
| *C09D 133/12* | (2006.01) |
| *C09D 201/00* | (2006.01) |

(52) U.S. Cl.
CPC ................ *C08F 2/18* (2013.01); *C08F 2/20* (2013.01); *C08F 6/24* (2013.01); *C08F 20/14* (2013.01); *C08F 220/1804* (2020.02); *C08J 3/12* (2013.01); *C09D 4/00* (2013.01); *C09D 7/40* (2018.01); *C09D 7/65* (2018.01); *C09D 11/107* (2013.01); *C09D 133/04* (2013.01); *C09D 133/12* (2013.01); *C09D 201/00* (2013.01); *C08F 2500/24* (2013.01); *C08J 2333/12* (2013.01)

(58) Field of Classification Search
CPC ........ C08F 2500/24; C08F 20/14; C08F 2/18; C08F 2/20; C08F 6/24; C08F 220/18; C08J 3/12; C08J 2333/12; C09D 7/65; C09D 7/40; C09D 4/00; C09D 11/107; C09D 133/04; C09D 133/12; C09D 201/00
USPC ........................................................ 524/804
See application file for complete search history.

(56) References Cited

U.S. PATENT DOCUMENTS

| | | | |
|---|---|---|---|
| 5,142,008 A | 8/1992 | Hölle et al. | |
| 6,475,420 B1 * | 11/2002 | Numrich | ............... B29C 43/222 264/211.12 |
| 2003/0031847 A1 | 2/2003 | Numrich et al. | |
| 2014/0011953 A1 | 1/2014 | Mallya et al. | |

FOREIGN PATENT DOCUMENTS

| | | |
|---|---|---|
| CN | 101747470 A | 6/2010 |
| CN | 101977894 A | 2/2011 |
| CN | 103492424 A | 1/2014 |
| EP | 1 749 868 A1 | 2/2007 |
| EP | 2 573 147 A1 | 3/2013 |
| JP | 62-148501 A | 7/1987 |
| JP | 01-231001 A | 9/1989 |
| JP | 07-025949 A | 1/1995 |
| JP | 2000-248142 | 9/2000 |
| JP | 2001-525277 A | 12/2001 |
| JP | 2003-306512 A | 10/2003 |
| JP | 2006-233145 A | 9/2006 |
| JP | 2006233145 A * | 9/2006 |
| JP | 2013-216764 A | 10/2013 |
| RU | 2013 137 804 A | 2/2015 |
| WO | 2015/195211 A1 | 12/2015 |

OTHER PUBLICATIONS

Chinese Office Action dated Jan. 10, 2020 in Chinese Patent Application No. 201680057656.4 (with unedited computer generated English translation), 10 pages.
Polymer Chemistry, Chemical Industry Press, edited by Pan Zuren, 2003, pp. 106 and 110 (with partial English translation).
Combined Chinese Office Action and Search Report dated Jun. 18, 2021 in corresponding Chinese Patent Application No. 202010141108.8 (with English Translation), 17 pages.
"Plastics Additives", Tianjin Institute of Light Industry, p. 337, China Light Industry Press, Mar. 1997, 4 pages (with English Translation).

(Continued)

*Primary Examiner* — Kelechi C Egwim
(74) *Attorney, Agent, or Firm* — Oblon, McClelland, Maier & Neustadt, L.L.P.

(57) ABSTRACT

Particles of an acrylic polymer comprising a constituent unit (A) derived from methyl methacrylate and a constituent unit (B) derived from a (meth)acrylic acid alkyl ester in which the alkyl group has 2 to 8 carbon atoms, wherein the particles having electrostatic buildup inhibition rate of 90 to 99.9° as obtained by a specific method.

20 Claims, No Drawings

(56) References Cited

OTHER PUBLICATIONS

Chinese Office Action dated Mar. 25, 2020, in Patent Application No. 201680057656.4, 10 pages (with unedited computer generated English translation).
European Office Action dated Mar. 6, 2020, in Patent Application No. 16 883 647.6, 4 pages.
Qi, Z. et al., "Research Progress of Waterborne Acrylic Resin for Ink", Journal of Beijing University of Technology (Natural Science Edition), vol. 23, No. 2, in Mar. 2005, 4 pages (with English abstract).
Mingfei, M. et al., "age and application of synthetic materials", suspension polymerization study fo solid acrylic resin for coatings, No. 1, 2002, 4 pages (with English abstract).
Chinese Office Action dated Jun. 3, 2020 in Chinese Patent Application No. 201680057656.4 (with English language machine translation), 12 pages.
Office Action dated Nov. 1, 2016 in Japanese Patent Application No. 2016-512159 (with English machine translation), filed Feb. 24, 2016.
International Search Report dated May 10, 2016, in PCT/JP2016/055431, filed Feb. 24, 2016.
Combined Russian Office Action and Search Report dated Aug. 1, 2018 in Russian Patent Application No. 2018111262 (with English translation).
Extended European Search Report dated Jan. 2, 2019, in European Patent Application No. 16883647.6, filed Feb. 24, 2016.
Office Action dated May 7, 2019, in Chinese Patent Application No. 201680057656.4, filed Feb. 24, 2016 (with English-language Translation).
Office Action dated Aug. 26, 2019, in European Patent Application No. 16883647.6, filed Feb. 24, 2016.
Office Action dated Jul. 24, 2020 in corresponding European Patent Application No. 16 883 647 6; 7 pages.
Extended European Search Report dated Aug. 3, 2020 in corresponding European Patent Application No. 20155810.3; 11 pages.
Korean Office Action dated Dec. 16, 2020 in Korean Patent Application No. 10-2018-7021975 (with unedited computer generated English translation), 13 pages.
Office Action dated May 20, 2022, in Chinese Patent Application No. 202010141108.8 (with English-language Translation).

\* cited by examiner

_US 11,427,655 B2_

ACRYLIC POLYMER PARTICLES, PRODUCTION PROCESS THEREFOR, INK COMPOSITION, AND COATING COMPOSITION

This application is a divisional of U.S. Non-Provisional application Ser. No. 15/941,946, filed on Mar. 30, 2018, which is a continuation of PCT/JP2016/055431 that was filed on Feb. 24, 2016. This application is based on and claims the benefit of priority of Japanese Patent Application No. 2016-000090, filed on Jan. 4, 2016, and the entire contents of which are incorporated herein by reference.

TECHNICAL FIELD

The present invention relates to particles of an acrylic polymer that are suitable for a coating material, ink, or the like, a process for producing the particles of an acrylic polymer, an ink composition, and a coating composition.

BACKGROUND ART

As a method useful for producing particles of an acrylic polymer, a suspension polymerization method is known. According to the suspension polymerization method, slurry of an acrylic polymer after polymerization is appropriately dehydrated and washed, and after subjecting it to a step like drying, particles of an acrylic polymer are produced. The particles of an acrylic polymer are used as a raw material of a coating composition, a raw material of an ink composition, a binder for a copy machine toner, a binder for ceramic calcination, an intermediate raw material of a thermoplastic resin, or the like.

With tendency of having low electric conductivity and large specific surface area, the particles of an acrylic polymer have a property of easy electrostatic buildup. Because it is easy for the particles of an acrylic polymer with electrostatic buildup to have low fluidity, there are cases in which blocking inside a pipe of a manufacturing plant or poor sieve device passability is caused by them. Furthermore, there are also cases of having a problem in handlability when the particles of an acrylic polymer are in a state of electrostatic buildup. Electrostatic buildup may easily occur after a drying step of the particles of an acrylic polymer. Due to those reasons, a method for suppressing electrostatic buildup during a step after the suspension polymerization is suggested.

For example, a method of providing conductivity according to a chemical treatment of a surface of particles of an acrylic polymer, a method of reducing friction among acrylic polymers by carrying out drying using a vacuum dryer or the like so that the electrostatic buildup may hardly occur, a method of drying the particles of an acrylic polymer with humidified air, a method of removing electrostatic buildup by carrying out an electric treatment of the particles of an acrylic polymer with electrostatic buildup, or the like are suggested.

However, those methods are problematic in that large amounts of money are required for facility investment or operation, process management is cumbersome, production rate is slow, or the like.

Accordingly, as a method for convenient and low-cost production of the particles of an acrylic polymer with excellent fluidity due to suppressed electrostatic buildup, in Patent Literature 1, for example, a method of washing the particles of an acrylic polymer after suspension polymerization with water in which electrolytes are dissolved at 1 to 1000 ppm is described.

CITATION LIST

Patent Literature

Patent Literature 1: JP 2003-306512 A

SUMMARY OF THE INVENTION

Problem to be Solved by the Invention

Meanwhile, the particles of an acrylic polymer are required to have not only the fluidity but also the solubility in an organic solvent. However, the particles of an acrylic polymer that are obtained by the method described in Patent Literature 1 have a problem that white cloudiness is yielded when they are dissolved in an organic solvent like toluene.

An object of the present invention is to provide particles of an acrylic polymer having excellent fluidity due to suppressed electrostatic buildup. Another object of the present invention is to provide particles of an acrylic polymer which have excellent solubility in an organic solvent. Still another object is to provide a process for producing the particles of an acrylic polymer, an ink composition, and a coating composition.

Means for Solving Problem

Namely, the present invention has the following embodiments.

[1] Particles of an acrylic polymer which contains a constituent unit (A) derived from methyl methacrylate and a constituent unit (B) derived from a (meth)acrylic acid alkyl ester in which the alkyl group has 2 to 8 carbon atoms, the particles having electrostatic buildup inhibition rate of 90 to 99.9% as obtained by the following method:
(Method for obtaining electrostatic buildup inhibition rate)

According to HS K 7365:1999 "Plastics—Method for determination of apparent density of material that can be poured from a specified funnel", volume density (A) of the particles of an acrylic polymer is measured. In addition, an anti-static agent is added in an amount of 0.1 g per 100 mL of the particles of an acrylic polymer volume density (B) of a mixture obtained by sufficiently mixing them is measured, and the electrostatic buildup inhibition rate is calculated based on the following mathematical equation (1).

$$\text{Electrostatic buildup inhibition rate (\%)}=\text{Volume density}(A)/\text{Volume density}(B)\times 100 \qquad (1)$$

[2] The particles of an acrylic polymer described in above [1] which a sodium element amount in the particles of an acrylic polymer is 3.5 to 50 ppm.

[3] The particles of an acrylic polymer described in above [2] in which the sodium element amount in the particles of an acrylic polymer is 3.5 to 30 ppm.

[4] The particles of an acrylic polymer described in above [1] in which the particles have a mass average particle diameter of 100 to 1000 μm.

[5] The particles of an acrylic polymer described in above [1] in which the particles of an acrylic polymer further contain a constituent unit (C) derived from α,β-unsaturated carboxylic acid.

[6] Particles of an acrylic polymer which contains a constituent unit (A) derived from methyl methacrylate and a constituent unit (B) derived from (meth)acrylic acid alkyl ester in which the alkyl group has 2 to 8 carbon atoms, the particles having a sodium element amount of 3.5 to 50 ppm.

[7] The particles of an acrylic polymer described in above [6] in which the sodium element amount in the particles of an acrylic polymer is 3.5 to 30 ppm.

[8] The particles of an acrylic polymer described in above [6] in which the particles have a mass average particle diameter of 100 to 1000 μm.

[9] The particles of an acrylic polymer described in above [6] in which the particles of an acrylic polymer further contain a constituent unit (C) derived from α,β-unsaturated carboxylic acid.

[10] A process for producing particles of an acrylic polymer described in any one of [1] to [9] including a step of washing the acrylic polymer obtained by suspension polymerization so as to have a sodium element amount of 3.5 to 50 ppm.

[11] The process for producing particles of an acrylic polymer described in [10] in which a dispersion agent containing sodium element is used for the suspension polymerization.

[12] The process for producing particles of an acrylic polymer described in [11] in which a use amount of the dispersion agent is an amount allowing that the sodium element amount contained in the dispersion agent is 0.0009 to 0.004 part by mass relative to 100 parts by mass of a raw material monomer of the particles of an acrylic polymer.

[13] The process for producing particles of an acrylic polymer described in [10] in which a dispersion aid containing sodium element is used for the suspension polymerization.

[14] The process for producing particles of an acrylic polymer described in [13] in which a use amount of the dispersion aid is an amount allowing that the sodium element amount contained in the dispersion aid is 0.06 to 0.35 part by mass relative to 100 parts by mass of a raw material monomer of the particles of an acrylic polymer.

[15] The process for producing particles of an acrylic polymer described in [10] in which the washing is carried out by using an aqueous solution of a sodium element-containing compound.

[16] The process for producing particles of an acrylic polymer described in [15] in which a use amount of the aqueous solution of a sodium element-containing compound is an amount allowing that the sodium element amount contained in the aqueous solution of a sodium element-containing compound is 0.03 to 0.1 part by mass relative to 100 parts by mass of the acrylic polymer.

[17] The process for producing particles of an acrylic polymer described in [15] in which mass of the aqueous solution of a sodium element-containing compound to be used for the washing is 1 to 3 times the acrylic polymer.

[18] An ink composition containing the particles of an acrylic polymer described in any one of [1] to [9].

[19] A coating composition containing the particles of acrylic polymer described in any one of [1] to [9],

[20] The coating composition described in [19] in which use of the coating composition is use for container, marine use, or use for road marking.

Effect of the Invention

According to the present invention, particles of an acrylic polymer having excellent fluidity due to suppressed electrostatic buildup, a process for producing the particles of an acrylic polymer, an ink composition, and a coating composition can be provided.

MODE(S) FOR CARRYING OUT THE INVENTION

"Particles of an Acrylic Polymer"

The acrylic polymer constituting the particles of an acrylic polymer of the present invention (hereinbelow, simply described as an "acrylic polymer") contains the constituent unit (A) derived from methyl methacrylate and the constituent unit (B) derived from a (meth)acrylic acid alkyl ester in which the alkyl group has 2 to 8 carbon atoms.

Furthermore, in the present invention, the term "(meth) acrylic acid" is a general name of acrylic acid and methacrylic acid.

Examples of the (meth)acrylic acid alkyl ester in which the alkyl group has 2 to 8 carbon atoms include ethyl acrylate, n-butyl acrylate, i-butyl acrylate, t-butyl acrylate, 2-ethylhexyl acrylate, ethyl methacrylate, n-butyl methacrylate, i-butyl methacrylate, t-butyl methacrylate, and 2-ethylhexyl methacrylate. Among them, from the viewpoint of having excellent weather resistance in hardened material of an ink composition or a coating composition containing particles of an acrylic polymer to be obtained and also easy obtainability, n-butyl methacrylate is preferable.

They may be used in combination of two or more kinds thereof.

It is possible that the acrylic polymer further contains the constituent unit (C) derived from α,β-unsaturated carboxylic acid.

The α,β-unsaturated carboxylic acid is not particularly limited as long as it can be copolymerized with methyl methacrylate and (meth)acrylic acid alkyl ester in which the alkyl group has 2 to 8 carbon atoms, and examples thereof include acrylic acid, methacrylic acid, maleic acid, fumaric acid, and itaconic acid.

They may be used in combination of two or more kinds thereof.

It is possible that the acrylic polymer further contains a constituent unit (D) other than the constituent unit (A), the constituent unit (B), and the constituent unit (C).

A monomer as a source of the constituent unit (D) is not particularly limited as long as it can be copolymerized with methyl methacrylate and (meth)acrylic acid alkyl ester in which the alkyl group has 2 to 8 carbon atoms. Examples of the monomer include acrylic acid esters such as methyl acrylate, lauryl acrylate; dodecyl acrylate, stearyl acrylate; phenyl acrylate; benzyl acrylate, glycidyl acrylate; 2-hydroxylethyl acrylate; 2-hydroxylpropyl acrylate, 2-methoxy ethyl acrylate; 2-ethoxyethyl acrylate, or phenoxyethyl acrylate; methacrylic acid esters such as lauryl methacrylate, dodecyl methacrylate; stearyl methacrylate, cyclohexyl methacrylate; isobornyl methacrylate; phenyl methacrylate, benzyl methacrylate, glycidyl methacrylate, 2-hydroxylethyl methacrylate, 2-hydroxylpropyl methacrylate, 2-methoxyethyl methacrylate, 2-ethoxyethyl methacrylate, or phenoxyethyl methacrylate; maleimides such as N-phenylmaleimide or N-cyclohexylmaleimide; aromatic vinyl compounds such as styrene, o-methylstyrene, m-methylstyrene, p-methylstyrene, or α-methylstyrene; polymerizable amides such as acrylamide or methacrylamide, and dialkylaminoethyl (meth)acrylates such as dimethylaminoethyl acrylate, diethylaminoethyl acrylate, dimethylaminoethyl methacrylate, or diethylaminoethyl methacrylate.

They may be used in combination of two or more kinds thereof.

Mass ratio between the constituent unit (A) and the constituent unit (B) in the acrylic polymer is, in terms of the constituent unit (A): the constituent unit (B), preferably 10:90 to 90:10, more preferably 20:80 to 80:20, and even more preferably 30:70 to 70:30. As the mass ratio is within this range, favorable performance balance between coating film hardness and wetting property on a surface of a coating subject is obtained when an ink composition or a coating composition is prepared with the polymer. In the acrylic polymer, the total content of the constituent unit (A) and the constituent unit (B) is preferably 80 to 100% by mass, more preferably 90 to 100% by mass, and even more preferably 95 to 100% by mass in 100% by mass of the total of all constituent units.

In a case in which the acrylic polymer contains the constituent unit (C), content of the constituent unit (C) is preferably 0.1 to 2% by mass in 100% by mass of the total of all constituent units. Content of the constituent unit (C) is more preferably 1.5% by mass or less, and even more preferably 1.2% by mass or less. As the content of the constituent unit (C) is the same or less than the aforementioned upper limit, a decrease in the fluidity of the particles of an acrylic polymer, which is caused by electrostatic buildup, is suppressed more so that an excellent pigment dispersion property is obtained when an ink composition or a coating composition is prepared with the polymer.

In a case in which the acrylic polymer contains the constituent unit (D), content of the constituent unit (D) is preferably 10% by mass or less, more preferably 5% by mass or less, and even more preferably 1% by mass or less in 100% by mass of the total of all constituent units. As the content of the constituent unit (D) is the same or less than the aforementioned upper limit, an excellent copolymerization property and excellent solvent solubility are obtained. In the present specification, ratio of each constituent unit of the acrylic polymer indicates a value which is calculated from the mass of an each monomer used as a raw material.

The particles of an acrylic polymer of the present invention have electrostatic buildup inhibition rate of 90 to 99.9%, in which the electrostatic buildup inhibition rate is obtained by the method described below. As the electrostatic buildup inhibition rate is within the above range, excellent fluidity is obtained. From the viewpoint of further enhancing the fluidity, the electrostatic buildup inhibition rate is preferably 95% or higher.

(Method for Obtaining Electrostatic Buildup Inhibition Rate)

According to JIS K 7365:1999 "Plastics—Method for determination of apparent density of material that can be poured from a specified funnel", volume density (A) of the particles of an acrylic polymer is measured. In addition, an anti-static agent is added in an amount of 0.1 g per 100 mL of the particles of an acrylic polymer, and volume density (B) of a mixture obtained by sufficiently mixing them is measured. As an anti-static agent, "SILPHONITE M-1" or "SILTON A", which is active silica manufactured by Mizusawa Industrial Chemicals Ltd., are suitable, for example. The electrostatic buildup inhibition rate is calculated from the measured volume density (A) and volume density (B) based on the following mathematical equation (1).

$$\text{Electrostatic buildup inhibition rate (\%)} = \text{Volume density}(A)/\text{Volume density}(B) \times 100 \quad (1)$$

The sodium element amount in the particles of an acrylic polymer of the present invention is preferably 3.5 to 50 ppm, more preferably 3.5 to 40 ppm, even more preferably 3.5 to 30 ppm, and particularly preferably 5 ppm to 30 ppm. As the sodium element amount is the same or more than the above lower limit, electrostatic buildup is suppressed more so that the fluidity is further enhanced. The effect of having enhanced fluidity tends to increase in accordance with an increase in the sodium element amount. However, as the sodium element amount is more than 50 ppm, the effect of suppressing electrostatic buildup tends to get saturated, thus yielding a limiting point of the fluidity enhancement. Furthermore, as the sodium element amount increases unnecessarily, purity of the particles of an acrylic polymer is impaired.

The sodium element in the particles of an acrylic polymer originates from sodium salts or the like that are included in a dispersion agent, a dispersion aid, or a washing liquid used for producing the particles of an acrylic polymer.

The sodium element in the particles of an acrylic polymer is measured by using a high frequency inductively coupled plasma (ICP) light emission spectrophotometer.

The average particle diameter of the particles of an acrylic polymer is preferably 100 to 1000 µm, and more preferably 120 to 700 µm. As the average particle diameter is the same or more than the above lower limit, a decrease in the fluidity caused by electrostatic buildup is suppressed more.

The average particle diameter indicates a value which is calculated from a particle size distribution obtained by measuring a mass-based particle size distribution using laser diffraction/scattering type particle size distribution analyzer after dispersing the particles of an acrylic polymer in water (mass average particle diameter).

Moisture content in the particles of an acrylic polymer is preferably 5% or less and more preferably 2% or less. Furthermore, the moisture content is calculated from mass of the particles of an acrylic polymer when the moisture content of the particles of an acrylic polymer after dehydration step followed by drying for 2 hours at 105° C. is set at 0%.

<Method for Production>

The particles of an acrylic polymer can be produced as described below, for example.

The process for producing the particles of an acrylic polymer of this embodiment has a polymerization step, a first dehydration step, a washing step, a second dehydration step, and a drying step.

(Polymerization Step)

The polymerization step is a step for obtaining an acrylic polymer by suspension polymerization of methyl methacrylate, (meth)acrylic acid alkyl ester in which the alkyl group has 2 to 8 carbon atoms, and, if necessary, α,β-unsaturated carboxylic acid or an optional monomer.

As for the method for suspension polymerization, a well-known method can be employed, and, for example, there is a method in which methyl methacrylate, (meth)acrylic acid alkyl ester in which the alkyl group has 2 to 8 carbon atoms, and, if necessary, α,β-unsaturated carboxylic acid or an optional monomer are polymerized, in the presence of a polymerization aid, in water in a vessel having polymerization temperature control and stirring functions.

Examples of the polymerization aid include a polymerization initiator, a chain transfer agent, a dispersion agent, and dispersion aid.

Examples of the polymerization initiator include 2,2'-azobisisobutyronitrile, 2,2'-azobis (2-methylbutyronitrile), benzoyl peroxide, and lauroyl peroxide.

Examples of the chain transfer agent include n-dodecyl mercaptan, octylthioglycolate, and α-methylstyrene dimer.

As for the dispersion agent, a surface active agent capable of stably dispersing a monomer in water can be mentioned, and specific examples thereof include a copolymer of sodium 2-sulfoethyl methacrylate, potassium methacrylate, and methyl methacrylate, a copolymer of sodium 3-sulfopropyl methacrylate and methyl methacrylate, a copolymer of sodium methacrylate and methacrylic acid, polyvinyl alcohol, polyvinyl pyrrolidone, hydroxylethylcellulose and hydroxylpropylcellulose.

Examples of the dispersion aid include sodium sulfate, sodium carbonate, sodium dihydrogen phosphate, disodium hydrogen phosphate, potassium chloride, calcium acetate, magnesium sulfate, and manganese sulfate.

To obtain the particles of an acrylic polymer in which a sodium element amount is 3.5 to 50 ppm, it is preferable to use, as a dispersion agent, those containing sodium like a copolymer of sodium 2-sulfoethyl methacrylate, potassium methacrylate, and methyl methacrylate, a copolymer of sodium 3-sulfopropyl methacrylate and methyl methacrylate, a copolymer of sodium methacrylate and methacrylic acid, and the like that are described above. Furthermore, it is preferable to use, as a dispersion aid, those containing sodium like sodium sulfate, sodium carbonate, sodium dihydrogen phosphate, disodium hydrogen phosphate, and the like.

The use amount of the dispersion agent containing sodium is an amount allowing that the sodium element amount contained in the dispersion agent is preferably 0.0009 to 0.004 part by mass, and more preferably 0.0012 to 0.003 part by mass relative to 100 parts by mass of the total raw material monomers of an acrylic polymer.

The use amount of the dispersion aid containing sodium is an amount allowing that the sodium element amount contained in the dispersion aid is preferably 0.06 to 0.35 part by mass, and more preferably 0.14 to 0.28 part by mass relative to 100 parts by mass of the total raw material monomers of an acrylic polymer.

As the use amount of the dispersion agent or dispersion aid containing sodium is within the aforementioned range, it becomes easier to obtain the particles of an acrylic polymer in which a sodium element amount is 3.5 to 50 ppm.

The acrylic polymer obtained by suspension polymerization is obtained in a slurry state.

In general, the particles of an acrylic polymer have a bead shape that is close to true sphere. Although the particle size of the particles of an acrylic polymer has a distribution, it is preferable that the mass average particle diameter is set within a range of 10 to 1000 μm.

(First Dehydration Step)

The first dehydration step is a step in which the slurry after suspension polymerization is dehydrated and the particles of an acrylic polymer are separated from a reaction solution.

For the dehydration, various kinds of a dehydrator can be used. For example, a centrifuge dehydrator, a centrifuge separator, a device for removing water by suction on porous belt, or the like can be suitably selected and used.

(Washing Step)

The washing step is a step of washing in which the particles of an acrylic polymer obtained by suspension polymerization are washed such that electrostatic buildup inhibition rate of the particles of an acrylic polymer to be obtained by final drying is 90 to 99.9%. The particles of an acrylic polymer which have electrostatic buildup inhibition rate of 90 to 99.9% can be obtained by carrying out, for example, washing such that the sodium element amount of the particles of an acrylic polymer, which are obtained by final drying, is 3.5 to 50 ppm.

According to the washing step, not only the purity of the particles of an acrylic polymer is increased but also particles of an acrylic polymer which have the sodium element amount of 3.5 to 50 ppm are obtained.

As for the washing method, there is a method of adding a washing solution to particles of an acrylic polymer that are dehydrated in the first dehydration step followed by re-slurrying of the acrylic polymer with stirring and mixing, a method of carrying out washing by, after performing the first dehydration step in a dehydrator which also has a washing function, adding continuously a washing solution or the like. It is also possible that the washing is carried out by combining those washing methods.

Type or amount of the washing solution can be selected so as to achieve the purpose of the washing step. Examples of a washing agent include water (ion exchange water, distilled water, purified water, or the like), aqueous solution in which sodium salts are dissolved (aqueous solution of Na salts, or the like), or the like.

In a case in which a dispersion agent or a dispersion aid containing sodium is used during the polymerization step, for example, it is preferable to use water or an aqueous solution of Na salts as a washing solution. In particular, when the sodium element amount is high in the particles of an acrylic polymer before washing, it is preferable to use water as a washing solution, and when the sodium element amount is low in the particles of an acrylic polymer before washing, it is preferable to use an aqueous solution of Na salts as a washing solution.

In a case in which a dispersion agent or a dispersion aid containing no sodium is used during the polymerization step, it is preferable to use an aqueous solution of Na salts as a washing solution.

Furthermore, in a case in which the sodium element amount is more than 50 ppm in the particles of an acrylic polymer after washing by using an aqueous solution of Na salts, washing is carried out again by using water or the like so that the sodium element amount can be within a range of 3.5 to 50 ppm.

Examples of the sodium salts that are used for an aqueous solution of Na salts include sodium chloride, sodium sulfate, sodium acetate, sodium isethionate, sodium, p-toulene sulfonate, and sodium carbonate.

Sodium concentration of the aqueous solution of Na salts is preferably is 500 to 2000 ppm, and more preferably 600 to 1000 ppm. As the sodium concentration is 500 ppm or more, the acrylic polymer can be provided with a sufficient anti-static property. As a result, the electrostatic buildup can be easily suppressed so that the fluidity is enhanced more. The effect of having enhanced fluidity tends to increase in accordance with an increase in the sodium salt concentration. However, as the sodium salt concentration is 2000 ppm or more, the effect of suppressing electrostatic buildup tends to get saturated, thus yielding a limiting point of the fluidity enhancement. Furthermore, as the sodium salts that are adhered and remained on a surface of the particles of an acrylic polymer increases, an impairment of the purity of the particles of an acrylic polymer is caused.

The amount of the washing solution for the washing step is preferably such that the particles of an acrylic polymer and the washing solution are present at 1:1 or higher in terms of the mass ratio (acrylic polymer:washing solution). Accordingly, the sodium salt amount in the washing solution can be easily reflected on a sodium element content of the acrylic polymer after washing, and thus the sodium element content in the particles of an acrylic polymer can be easily controlled.

As a method for producing industrially an aqueous solution of Na salts with predetermined concentration which is used for the washing, there is a method in which water and sodium salts are mixed with each other at predetermined ratio in a tank having stirrer to produce in advance a high-concentration aqueous solution of Na salts, and a certain amount of the aqueous solution of Na salts is transported to a supply line with flowing water to mix the high-concentration aqueous solution of Na salts with water. It is favorable that the washing is carried out by supplying the resulting mixture via a supply line to the particles of an acrylic polymer.

Number of the washing is not particularly limited, and it can be carried out once or twice or more as long as the sodium element amount in the particles of an acrylic polymer becomes 3.5 to 50 ppm.

(Second Dehydration Step)

The second dehydration step is a step in which the particles of an acrylic polymer after the washing step are dehydrated.

For the dehydration, various dehydrators can be used, and those exemplified for explaining the first dehydration step can be mentioned, for example.

As for the dehydrator used for the first dehydration step and the dehydrator used for the second dehydration step, one dehydrator may be used for both steps, two dehydrators of the same type may be used for each dehydration step, or dehydrators of different type may be used for each dehydration step. Selection can be made suitably to meet the purpose in view of product quality, cost related to facility investment, productivity, cost required for operation, or the like. When balance between product quality and production rate is taken importantly, it is preferable to use a dehydrator exclusive for each dehydration step.

(Drying Step)

The drying step is a step for drying the particles of an acrylic polymer after the second dehydration step.

Water remains on a surface of the particles of an acrylic polymer after the second dehydration step. Furthermore, inside of the acrylic polymer is in a state of almost saturated water absorption. Due to such reasons, it is preferable to dry the polymer to further decrease the moisture content in the acrylic polymer.

For the drying, various kinds of a dryer can be used, and examples include carrying out the drying by heating under reduced pressure, carrying out the drying simultaneously supplying the particles of an acrylic polymer into a pipe by using heated air, and carrying out the drying while fluidizing the particles of an acrylic polymer at the top side by injecting heated air from the bottom side of a porous plate.

The drying step is carried out such that the moisture content in the acrylic polymer after the drying step is preferably 5% or less, and more preferably 2% or less.

<Working Effects>

The particles of an acrylic polymer of the present invention explained above have electrostatic buildup inhibition rate of 90 to 99.9%, and thus have excellent fluidity. In particular, as the sodium element amount is 3.5 to 50 ppm, the electrostatic buildup is further suppressed, and thus the fluidity can be enhanced more. As such, it is expected to resolve the problem of clogging in a pipe through which the particles of an acrylic polymer are transported. Furthermore, the particles of a powder-like acrylic polymer after a drying treatment may be sometimes get passed through a sieve device under the purpose of collecting only the particles with desired particle size, and an improvement in passability is expected therefor. Furthermore, in terms of the handling of the particles of an acrylic polymer at destination, it is unlikely to have a problem of poor fluidity. Still furthermore, since the particles of an acrylic polymer of the present invention have suppressed electrostatic buildup, flame ignition hardly occurs thereon.

Furthermore, according to the process for producing the particles of an acrylic polymer of the present invention, particles of a powder-like acrylic polymer with excellent fluidity can be produced conveniently at low cost due to suppressed electrostatic buildup.

Furthermore, the process for producing the particles of an acrylic polymer of the present invention is not limited to the embodiment which is described above. For example, although a second dehydration step is carried out in the embodiment that is described above, such secondary dehydration step may be omitted. Furthermore, it is also possible that, when the sodium element amount in the acrylic polymer obtained by the polymerization step is 3.5 to 50 ppm, the washing step may be omitted. However, in view of the purpose of increasing the purity of the acrylic polymer by removing unreacted monomers or the like, the washing step is preferably carried out even when the sodium element amount in the acrylic polymer obtained by the polymerization step is 3.5 to 50 ppm.

Furthermore, each step described above may be continuously carried out, or the polymerization step and washing step may be carried out in different areas.

<Use>

The particles of an acrylic polymer of the present invention can be used as a raw material of an ink composition, a raw material of a coating composition, a binder for a copy machine toner, a binder for ceramic calcination, an intermediate raw material of a thermoplastic resin, or the like. They are particularly suitable as a raw material of an ink composition or a raw material of a coating composition.

"Ink Composition"

The ink composition of the present invention contains the particles of an acrylic polymer of the present invention.

The ink composition of the present invention is obtained by mixing, for example, the particles of an acrylic polymer of the present invention with a pigment, an organic solvent, and, if necessary, an optional component.

As for the pigment, a well-known pigment used as a raw material of an ink can be mentioned.

As for the organic solvent, a well-known organic solvent used as a raw material of an ink can be mentioned.

As for the optional component, various kinds of well-known additives that are used as a raw material of an ink can be mentioned.

"Coating Composition"

The coating composition of the present invention contains the particles of an acrylic polymer of the present invention.

The coating composition of the present invention can be used as a coating material for container, a coating material for marine use, or a coating material for road marking, for example.

The coating material for marine use indicates a coating material for coating a deck of a ship or the like.

The coating material for road marking indicates a coating material for displaying a road sign or the like on a road.

When the coating composition of the present invention is used for a container, a coating composition obtained by mixing the particles of an acrylic polymer of the present invention with a pigment, calcium carbonate, chlorinated paraffin, an organic solvent, and, if necessary, an optional component is suitable.

When the coating composition of the present invention is used for marine use, it is obtained by mixing the particles of an acrylic polymer of the present invention with a pigment, an organic solvent, and, if necessary, an optional component.

When the coating composition of the present invention is used for road marking, it is obtained by mixing the particles of an acrylic polymer of the present invention with a pigment, calcium carbonate, an organic solvent, and, if necessary, an optional component.

As for the pigment, a well-known pigment used as a raw material of a coating material can be mentioned.

As for the organic solvent, a well-known organic solvent used as a raw material of a coating material can be mentioned.

As for the optional component, various kinds of well-known additives that are used as a raw material of a coating material can be used in accordance with the use of the coating composition.

EXAMPLES

Hereinbelow, the present invention is more specifically explained in view of Examples. However, the present invention is not limited thereto.

Measurement and evaluation of each physical property in Examples and Comparative Examples were carried out according to the following methods.

Furthermore, the dispersion agents that are used in Examples and Comparative Examples were prepared according to the following method.

[Measurement•Evaluation]
<Measurement of Sodium Element Amount>

The particles of an acrylic polymer (0.15 g) were collected in a platinum crucible and heated on a hot plate over 1 hour from 150° C. to 540° C. and also for 30 minutes at 540° C. Subsequently, the particles of an acrylic polymer were turned into ash in a muffle furnace at 575° C. for 1 hour. To the resultant, 250 µL of 1% by mass aqueous solution of nitric acid were added for dissolution, and dilution to 25 mL was made with ultra pure water. The diluted product was applied to an ICP light emission spectrophotometer to measure the sodium element amount (Na element amount). Furthermore, the measurement conditions are as described in the followings.

(ICP Measurement Conditions)
Apparatus: iCAP 6500 manufactured by Thermo Fischer Scientific Inc.
RF power: 750 w
Pump flow rate: 50 rpm
Assisting gas flow rate: 1 L/min
Nebulizer gas flow rate: 0.5 L/min
Coolant gas flow rate: 12 L/min
Purge gas flow rate: Normal
Wavelength for measurement: 589.592 (nm)
<Measurement of Average Particle Diameter>

The particles of an acrylic polymer were dispersed in water, and by using "LA-910", which is a laser diffraction/scattering type particle size distribution analyzer manufactured by HORIBA, Ltd., mass-based particle size distribution was measured and mass average particle diameter was obtained from the obtained particle size distribution.

<Evaluation of Electrostatic Buildup Inhibition Rate>
According to JIS K 7365:1999 "Plastics—Method for determination of apparent density of material that can be poured from a specified funnel", volume density (A) of the particles of an acrylic polymer was measured. In addition, an anti-static agent ("SILPHONITE M-1" manufactured by Mizusawa Industrial Chemicals Ltd.) was added in an amount of 0.1 g per 100 mL of the particles of an acrylic polymer, volume density (B) of a mixture obtained by sufficiently mixing them was measured, and the electrostatic buildup inhibition rate was calculated based on the equation (1) shown below. Furthermore, when the measurement is made without using an anti-static agent, there is generally a tendency of having smaller volume density as caused by electrostatic repulsion, and, when the measurement is made with use of an anti-static agent, there is a tendency of having higher volume density as caused by reduced electrostatic repulsion. Namely, as the electrostaticity decreases even without using an anti-static agent (that is, as electrostatic buildup is suppressed more), a smaller change in the volume density between a case before the addition of an anti-static agent and a case after the addition of an anti-static agent is yielded, and the electrostatic buildup inhibition rate obtained by the following mathematical formula (1) gets closer to 100%.

$$\text{Inhibition rate (\%)} = \text{Volume density}(A)/\text{Volume density}(B) \times 100 \qquad (1)$$

<Evaluation of Fluidity>

The fluidity of the particles of an acrylic polymer was measured as follows; a powder funnel made of polyvinyl chloride, which has a mouth diameter of 15 cm and a foot diameter of 1 cm, was used, and while the funnel is fixed, 30 g of the particles of an acrylic polymer were added to the funnel, and the evaluation was made in view of the falling state of the particles.

(Evaluation Criteria)
A: The entire amount of the particles had fallen continuously.
B: Particle clogging had occurred during the process so that not all of the entire amount had fallen.

<Evaluation of Solubility of Particles of Acrylic Polymer in Toluene>

Toluene (40 g) was added to a flask. While stirring it at room temperature using a stirrer, the particles of an acrylic polymer (60 g) were added thereto in small portions. After stirring them for 2 hours at 60° C., the solubility was determined by naked eye observation based on transparency of the solution.

(Evaluation Criteria)
A: The solution was transparent and excellent solubility was obtained.
B: There was just slight white cloudiness of the solution, and the solubility was good.
C: There was white cloudiness of the solution, and the solubility was poor.

[Preparation of Dispersion Agent (1)]

In a polymerization device equipped with a stirrer, a condenser, and a thermometer, 1230 part by mass of deionized water, 60 part by mass of sodium 2-sulfoethyl methacrylate, 10 parts by mass of potassium methacrylate, and 12 parts by mass of methyl methacrylate were added followed by stirring. Under nitrogen purging inside the polymerization device, the polymerization temperature was increased to 50° C., 0.08 part by mass of 2,2'-azobis (2-methylpropionamidin) dihydrochloride was added as a polymerization initiator, and the polymerization temperature was further increased to 60° C. Simultaneously with the addition of a polymerization initiator, methyl methacrylate was added continuously for 75 minutes at rate of 0.24 part by mass/min by using a dropping pump. After maintaining it for 6 hours at polymerization temperature of 60° C., cooling to room temperature was carried out to obtain dispersion agent (1). Solid content in the dispersion agent (1) was found to be 7.5% by mass.

Example 1

To a polymerization device equipped with a stirrer, a condenser, and a thermometer, a monomer mixture in which 39.8 part by mass of methyl methacrylate, 60 part by mass of n-butyl methacrylate, and 0.2 part by mass of methacrylic acid are homogeneously dissolved, and 200 part by mass of pure water in which 0.25 part by mass of 2,2'-azobis (2-methylbutyronitrile) as a polymerization initiator, 0.3 part by mass of n-dodecylmercaptan as a chain transfer agent, 0.8 part by mass of the dispersion agent (1), and 1.0 part by mass of sodium sulfate as a dispersion aid are homogeneously dissolved were added, and nitrogen purging was carried out under stirring. After that, suspension polymerization was initiated at 75° C. After detecting an exothermic peak of the polymerization, the polymerization was further carried out for 30 minutes at 80° C. (polymerization step).

Subsequently, the inside of the furnace was cooled to room temperature. One third of the amount of the generated slurry was collected, and then dehydrated by using a centrifuge type dehydrator (dehydration step).

The obtained particles of an acrylic polymer and an aqueous solution of sodium sulfate as a washing solution in which the sodium sulfate concentration is 1000 ppm were added to a washing bath such that they are present at 1:2 in terms of the mass ratio (particles of an acrylic polymer: washing solution). After carrying out washing by stirring and mixing for 20 minutes (washing step), the resultant was dehydrated by using a centrifuge dehydrator (dehydration step).

Subsequently, the dehydrated particles of an acrylic polymer were added to a fluid bath type dehydrator of which internal temperature is set at 50° C., and the particles were dried to have moisture content of 2% or less (drying step). Furthermore, the moisture content was calculated from the mass of an acrylic polymer after the drying step, when the particles of an acrylic polymer after the dehydration step are dried for 2 hours at 105° C. and the moisture content of the resulting acrylic polymer is set at 0%.

Na element amount and average particle diameter were then measured for the particles of a powder-like acrylic polymer which have been obtained as described above, and the evaluation was made for electrostatic buildup inhibition rate, fluidity, and solubility in toluene. The results are shown in Table 1.

Example 2

Particles of a powder-like acrylic polymer were produced in the same manner as Example 1 except that number of the washing step is modified to 3. Various kinds of measurements and evaluations were then carried out. The results are shown in Table 1. Furthermore, for each washing step, the washing solution was changed to a non-used solution.

Example 3

Particles of a powder-like acrylic polymer were produced in the same manner as Example 1 except that ion exchange water is used as the washing solution. Various kinds of measurements and evaluations were then carried out. The results are shown in Table 1.

Example 4

Particles of a powder-like acrylic polymer were produced in the same manner as Example 1 except that ion exchange water is used as the washing solution and number of the washing step is modified to 3. Various kinds of measurements and evaluations were then carried out. The results are shown in Table 1. Furthermore, for each washing step, the washing solution was changed to a non-used solution.

Example 5

Particles of a powder-like acrylic polymer were produced in the same manner as Example 2 except that the use amount of sodium sulfate in the polymerization step is modified to 0.2 part by mass. Various kinds of measurements and evaluations were then carried out. The results are shown in Table 1.

Example 6

Particles of a powder-like acrylic polymer were produced in the same manner as Example 5 except that the use amount of the dispersion agent (1) in the polymerization step is modified to 0.2 part by mass. Various kinds of measurements and evaluations were then carried out. The results are shown in Table 1.

Example 7

Particles of a powder-like acrylic polymer were produced in the same manner as Example 4 except that the use amount of methyl methacrylate in the polymerization step is modified to 40 part by mass and methacrylic acid is not used. Various kinds of measurements and evaluations were then carried out. The results are shown in Table 1.

Comparative Example 1

Particles of a powder-like acrylic polymer were produced in the same manner as Example 4 except that, in the polymerization step, the use amount of the dispersion agent (1) is modified to 0.2 part by mass and the use amount of sodium sulfate is modified to 0.2 part by mass. Various kinds of measurements and evaluations were then carried out. The results are shown in Table 1.

Comparative Example 2

Particles of a powder-like acrylic polymer were produced in the same manner as Example 4 except that the use amount of sodium sulfate in the polymerization step is modified to 0.2 part by mass. Various kinds of measurements and evaluations were then carried out. The results are shown in Table 1.

Comparative Example 3

Particles of a powder-like acrylic polymer were produced in the same manner as Comparative Example 1 except that the use amount of sodium sulfate in the polymerization step is modified to 1.0 part by mass and washing is not carried out. Various kinds of measurements and evaluations were then carried out. The results are shown in Table 1.

Comparative Example 4

Particles of a powder-like acrylic polymer were produced in the same manner as Example 1 except that, in the polymerization step, the use amount of the dispersion agent (1) is modified to 0.1 part by mass and the use amount of sodium sulfate is modified to 0.6 part by mass, and, in the washing step, concentration of an aqueous solution of sodium sulfate is modified to 400 ppm. Various kinds of measurements and evaluations were then carried out. The results are shown in Table 1.

Furthermore, particles of an acrylic polymer obtained from Comparative Example 3 have electrostatic buildup inhibition rate of 100%, but they have insufficient solubility in toluene.

INDUSTRIAL APPLICABILITY

According to the present invention, particles of an acrylic polymer having excellent fluidity due to suppressed electrostatic buildup, a process for producing the particles of an acrylic polymer, an ink composition, and a coating composition can be provided. As such, the present invention can be suitably utilized in the field of particles of an acrylic polymer, and thus it is industrially very important.

TABLE 1

| | Acrylic polymer Monomer composition | Dispersion agent (1) [part by mass] | Dispersion aid [part by mass] | Method for washing Washing solution | Number (times) | Na element amount of acrylic polymer [ppm] | Electrostatic buildup inhibition rate [%] | Fluidity | Solubility in toluene | Average particle diameter [mm] |
|---|---|---|---|---|---|---|---|---|---|---|
| Example 1 | Methyl methacrylic acid/n-butyl methacrylate/ methacrylic acid = 39.8/60/0.2 | 0.8 | 1.0 | $Na_2SO_4$ aqueous solution [1000 ppm] | 1 | 41 | 97 | A | B | 139 |
| Example 2 | | 0.8 | 1.0 | $Na_2SO_4$ aqueous solution [1000 ppm] | 3 | 35 | 96 | A | B | 138 |
| Example 3 | | 0.8 | 1.0 | Ion exchange water | 1 | 19 | 94 | A | A | 130 |
| Example 4 | | 0.8 | 1.0 | Ion exchange water | 3 | 7.3 | 92 | A | A | 135 |
| Example 5 | | 0.8 | 0.2 | $Na_2SO_4$ aqueous solution [1000 ppm] | 3 | 20 | 94 | A | A | 220 |
| Example 6 | | 0.2 | 0.2 | $Na_2SO_4$ aqueous solution [1000 ppm] | 3 | 17 | 93 | A | A | 269 |
| Example 7 | Methyl methacrylic acid/n-butyl methacrylate = 40/60 | 0.8 | 1.0 | Ion exchange water | 3 | 7.3 | 92 | A | A | 140 |
| Comparative Example 1 | Methyl methacrylic acid/n-butyl methacrylate/ methacrylic acid = 39.8/60/0.2 | 0.2 | 0.2 | Ion exchange water | 3 | 0.3 | 82 | B | A | 262 |
| Comparative Example 2 | | 0.8 | 0.2 | Ion exchange water | 3 | 2.2 | 86 | B | A | 216 |
| Comparative Example 3 | | 0.2 | 1.0 | No washing | 0 | 73 | 100 | A | C | 457 |
| Comparative Example 4 | | 0.1 | 0.6 | Na2SO4 aqueous solution [400 ppm] | 1 | 3 | 88 | B | A | 550 |

As it is clearly shown from the results of Table 1, the particles of an acrylic polymer, which have been obtained from Examples 1 to 7 and satisfy the constitution of the present invention, have electrostatic buildup inhibition rate of 92% or more, thus showing sufficiently suppressed electrostatic buildup. Furthermore, the particles of an acrylic polymer, which have been obtained from Examples 1 to 7 and have Na element amount in a range of 3.5 to 50 ppm, have sufficiently suppressed electrostatic buildup. Furthermore, the particles of an acrylic polymer obtained from Examples 1 to 7 have excellent fluidity. Furthermore, the particles of an acrylic polymer which have been obtained from Examples 1 to 7 have excellent solubility in toluene.

On the other hand, the particles of an acrylic polymer obtained from Comparative Examples 1, 2, and 4 have electrostatic buildup inhibition rate of 88% or less. Furthermore, the particles of an acrylic polymer, which have been obtained from Comparative Examples 1, 2, and 4 and have Na element amount of 3 ppm or less, exhibit poor fluidity.

The invention claimed is:
1. Particles of an acrylic polymer, comprising
   a constituent unit (A) derived from methyl methacrylate and a constituent unit (B) derived from a (meth)acrylic acid alkyl ester in which the alkyl group has 2 to 8 carbon atoms,
   wherein the particles are formed of one type of acrylic copolymer obtained by a single polymerization step, and
   wherein the particles having electrostatic buildup inhibition rate of 90 to 99.9% as obtained by the following method:
   (Method for obtaining electrostatic buildup inhibition rate):
      According to JIS K 7365:1999 "Plastics Method for determination of apparent density of material that can be poured from a specified funnel", volume density (A) of the particles of an acrylic polymer is measured, In addition, an anti-static agent is added in an amount of 0.1 g per 100 mL of the particles of an acrylic polymer, volume density (B) of a mixture obtained by sufficiently mixing them is measured, and the electrostatic buildup inhibition rate is calculated based on the following mathematical equation (1).

Electrostatic buildup inhibition rate (%)=Volume density($A$)/Volume density ($B$)×100    (1)

2. The particles of an acrylic polymer according to claim 1, wherein a sodium element amount in the particles of an acrylic polymer is 3.5 to 50 ppm.

3. The particles of an acrylic polymer according to claim 2, wherein the sodium element amount in the particles of an acrylic polymer is 3.5 to 30 ppm.

4. The particles of an acrylic polymer according to claim 1, wherein the particles have a mass average particle diameter of 100 to 1000 μm.

5. The particles of an acrylic polymer according to claim 1, further comprising a constituent unit (C) derived from α,β-unsaturated carboxylic acid.

6. Particles of an acrylic polymer, comprising a constituent unit (A) derived from methyl methacrylate and a constituent unit (B) derived from (meth)acrylic acid alkyl ester in which the alkyl group has 2 to 8 carbon atoms, the particles having a sodium element amount of 3.5 to 50 ppm,
wherein the particles are formed of one type of acrylic copolymer obtained by a single polymerization step.

7. The particles of an acrylic polymer according to claim 6, wherein the sodium element amount in the particles of an acrylic polymer is 3.5 to 30 ppm.

8. The particles of an acrylic polymer according to claim 6, wherein the particles have a mass average particle diameter of 100 to 1000 μm.

9. The particles of an acrylic polymer according to claim 6, further comprising a constituent unit (C) derived from α,β-unsaturated carboxylic acid.

10. A process for producing particles of an acrylic polymer according to claim 1, the process comprising a step of washing the acrylic polymer obtained by suspension polymerization so as to have a sodium element amount of 3.5 to 50 ppm.

11. The process for producing particles of an acrylic polymer according to claim 10, wherein a dispersion agent containing sodium element is used for the suspension polymerization.

12. The process for producing particles of an acrylic polymer according to claim 11, wherein a use amount of the dispersion agent is an amount allowing that the sodium element amount contained in the dispersion agent is 0.0009 to 0.004 part by mass relative to 100 parts by mass of a raw material monomer of the particles of an acrylic polymer.

13. The process for producing particles of an acrylic polymer according to claim 10, wherein a dispersion aid containing sodium element is used for the suspension polymerization.

14. The process for producing particles of an acrylic polymer according to claim 13, wherein a use amount of the dispersion aid is an amount allowing that the sodium element amount contained in the dispersion aid is 0.06 to 0.35 part by mass relative to 100 parts by mass of a raw material monomer of the particles of an acrylic polymer.

15. The process for producing particles of an acrylic polymer according to claim 10, wherein the washing is carried out by using an aqueous solution of a sodium element-containing compound.

16. The process for producing particles of an acrylic polymer according to claim 15, wherein a use amount of the aqueous solution of a sodium element-containing compound is an amount allowing that the sodium element amount contained in the aqueous solution of a sodium element-containing compound is 0.03 to 0.1 part by mass relative to 100 parts by mass of the acrylic polymer.

17. The process for producing particles of an acrylic polymer according to claim 15, wherein mass of the aqueous solution of a sodium element-containing compound to be used for the washing is 1 to 3 times the acrylic polymer.

18. An ink composition, comprising the particles of an acrylic polymer according to claim 1.

19. A coating composition, comprising the particles of an acrylic polymer according to claim 1.

20. An article, comprising the coating composition of claim 19, wherein the article is a container, marine article, or a road marking.

* * * * *